United States Patent [19]

Preston, Jr.

[11] 4,190,641
[45] Feb. 26, 1980

[54] METHOD FOR PRODUCING HYDROGEN

[75] Inventor: John L. Preston, Jr., Hebron, Conn.

[73] Assignee: United Technologies Corporation, Hartford, Conn.

[21] Appl. No.: 966,929

[22] Filed: Dec. 6, 1978

[51] Int. Cl.$^2$ .......................... C01B 1/02; C01B 1/18
[52] U.S. Cl. .................................. 423/653; 252/373; 423/656
[58] Field of Search ................ 423/656, 655, 652–654; 252/373

[56] References Cited

U.S. PATENT DOCUMENTS

| | | | |
|---|---|---|---|
| 2,655,442 | 10/1953 | Mayland | 423/653 X |
| 2,815,331 | 12/1957 | Ashley et al. | 423/656 |
| 2,892,685 | 6/1959 | Paull | 423/655 |
| 3,361,534 | 1/1968 | Johnson et al. | 423/653 |
| 3,545,926 | 12/1970 | Schlinger et al. | 252/373 X |
| 3,684,689 | 8/1972 | Patton et al. | 252/373 X |

OTHER PUBLICATIONS

Catalyst Handbook (1970), Springer-Verlay N.Y. Inc., N.Y., pp. 102 & 103.

*Primary Examiner*—Edward J. Meros
*Attorney, Agent, or Firm*—Stephen E. Revis

[57] ABSTRACT

In a method for producing high quality hydrogen, the carbon monoxide level of a hydrogen stream which also contains hydrogen sulfide is shifted in a bed of iron oxide shift catalyst to a desired low level of carbon monoxide using less catalyst than the minimum amount of catalyst which would otherwise be required if there were no hydrogen sulfide in the gas stream. Under normal operating conditions the presence of even relatively small amounts of hydrogen sulfide can double the activity of the catalyst such that much less catalyst may be used to do the same job.

8 Claims, 4 Drawing Figures

METHOD FOR PRODUCING HYDROGEN

BACKGROUND OF THE INVENTION

Field of the Invention—The present invention relates to the production of hydrogen, and more particularly to reducing the carbon monoxide level in a hydrogen stream using a shift converter.

Description of the Prior Art—In one method for producing hydrogen a hydrocarbon feedstock and steam are fed into a steam reforming reactor containing a nickel catalyst. In the reactor, the hydrocarbons are converted to hydrogen, carbon dioxide and carbon monoxide.

If the hydrogen produced is to be used in a fuel cell wherein the electrode catalyst is platinum, it may be desirable to reduce the carbon monoxide level in the reactor effluent to very low levels to minimize poisoning of the platinum. A shift converter may be used for this purpose. In the shift converter water in the reactor effluent combines with the carbon monoxide to produce hydrogen and carbon dioxide as represented by the following equation:

$$H_2O + CO \rightarrow H_2 + CO_2$$

A typical shift converter catalyst is iron oxide stabilized with chromia.

Most raw hydrocarbon feedstocks contain some sulfur which, in high enough concentrations, poisons the nickel steam reforming catalyst if reforming is conducted at temperatures below about 1500° F. When light hydrocarbon feedstocks are used, such as natural gas, naphtha or L. P. gas (propane), the sulfur contained therein is reduced to acceptable levels upstream of the reactor by converting the organic sulfur in the feedstock to hydrogen sulfide using a hydrodesulfurizer, and subsequently removing the $H_2S$ in an adsorbent bed of zinc oxide and/or charcoal. Commonly owned U.S. Pat. Nos. 3,476,535 and 3,480,417 show fuel cell systems with desulfurizing means upstream of a steam reforming reactor. With heavier feedstock, such as No. 2 fuel oil, the sulfur content of the fuel may be so high and the sulfur compounds so unreactive that it is not practical or perhaps not desirable to remove the sulfur upstream of the reactor. Instead the reactor may be run at a much higher temperature, such as greater than 1500° F. whereby the sulfur does not completely poison the catalyst and is converted to hydrogen sulfide within the reactor. It is known, however, that high levels of sulfur (in the form of hydrogen sulfide) in the shift converter feed may react with the iron oxide-chromia shift conversion catalyst and convert the iron oxide to iron sulfide which is only 50% as active, in terms of shift converting, as iron oxide. If this is the case, the practice has been to either remove this hydrogen sulfide upstream of the shift converter or to use, for example, twice the amount of shift catalyst to compensate for the 50% reduction in activity.

Assuming the $H_2S$ concentration is not so high as to result in the conversion of iron oxide to iron sulfide, it is taught that $H_2S$ is, at best, a mild poison to the iron oxide catalyst. For example, the *Catalyst Handbook* (1970) distributed by Springer-Verlay N.Y. Inc., N.Y. (Library of Congress Catalogue #70-121128) states on page 103 that less than 1 ppm $H_2S$, by volume, in the inlet gas results in increased catalytic activity, but 50 and 100 ppm $H_2S$ results in normal and decreased activity, respectively. Thus, to reduce the amount of carbon monoxide in a hydrogen sulfide containing gas stream to a preselected level, it has been the practice to use an amount of catalyst in excess of the amount which would normally be required if there were no hydrogen sulfide in the gas stream, the additional amount of catalyst needed being determined by the expected reduction in catalyst activity.

SUMMARY OF THE INVENTION

According to the present invention, a hydrogen stream containing hydrogen sulfide and carbon monoxide is shifted in a bed of iron oxide shift catalyst to reduce the carbon monoxide concentration to a desired level using less catalyst than the minimum amount of catalyst which would otherwise be required if there were no hydrogen sulfide in the gas stream.

We have surprisingly found that, contrary to prior art teachings, the activity of chromia stabilized iron oxide shift catalyst increases considerably when sulfur, in the form of hydrogen sulfide, is present in the gas stream. Furthermore, the catalyst activity continues to increase as the hydrogen sulfide concentration increases up to the point where the concentration is so great that the iron oxide is converted to iron sulfide, whereupon the activity drops to 50% of normal iron oxide activity. We have found that the presence of only 30 parts per million $H_2S$, by volume in the dry gas, can almost double the catalyst activity thereby permitting the use of a considerably smaller volume of catalyst than would otherwise have been thought possible under these conditions.

The foregoing and other objects, features, and advantages of the present invention will become more apparent in the light of the following detailed description of preferred embodiments thereof as illustrated in the accompanying drawing.

DESCRIPTION OF PREFERRED EMBODIMENTS

The present invention is particularly useful in a fuel cell power plant. A fuel cell power plant includes its own fuel processing equipment for converting hydrocarbon feedstock to hydrogen for use as a reactant in the fuel cells. For example, a steam reformer may be used to convert the hydrocarbon feedstock to hydrogen; however, depending upon the feedstock used and the conditions within the reformer, the reformer effluent may contain as much as 20%, by volume, carbon monoxide. More typically, the effluent will contain between 10 and 15% carbon monoxide. (Note: In this application all references to volume % are dry gas volume %'s.) The ratio of moles steam to moles carbon in the hydrocarbon feedstock at the reformer inlet may be between 3 and 8 but is preferably between 3.5 and 4.5. Certain types of fuel cells, such as those which use phosphoric acid as the electrolyte and platinum as the electrode catalyst, suffer a considerable performance loss at high levels of carbon monoxide concentration. In such a fuel cell system a shift converter is commonly used to reduce the carbon monoxide concentration to an acceptable level.

In one exemplary fuel cell power plant the fuel conditioning apparatus comprises a high temperature steam reforming reactor containing a nickel catalyst followed by a chromia stabilized iron-oxide shift converter. The reactor is designed to operate at temperatures above about 1500° F. so that hydrocarbon feedstocks containing large amounts of organic sulfur may be directly steam reformed without the necessity of reducing the sulfur content of the fuel to very low levels prior to reforming. In the reformer the organic sulfur in the feedstock is converted to hydrogen sulfide and the hydrocarbons are converted to hydrogen, carbon monoxide and carbon dioxide. After cooling the reformer effluent to a temperature between 600° and 900° F., which is the operational temperature range of the shift catalyst, the gas stream is fed into the shift converter whereupon the carbon monoxide concentration may be reduced to on the order of 3%, by volume.

The effluent from the shift converter may be further processed, if desired, before the gas stream is ready for use in the fuel cell. For example, a second but different type of shift converter—one which operates within a temperature range of 400° to 800° F. and uses a sulfided cobalt-molybdate catalyst—may be used to reduce the CO concentration even lower, such as to 1 or 2%, by volume. Also, the H₂S which is still in the gas stream may be removed by conventional means, such as by the use of a bed of zinc oxide which adsorbs the hydrogen sulfide.

Figure 1:
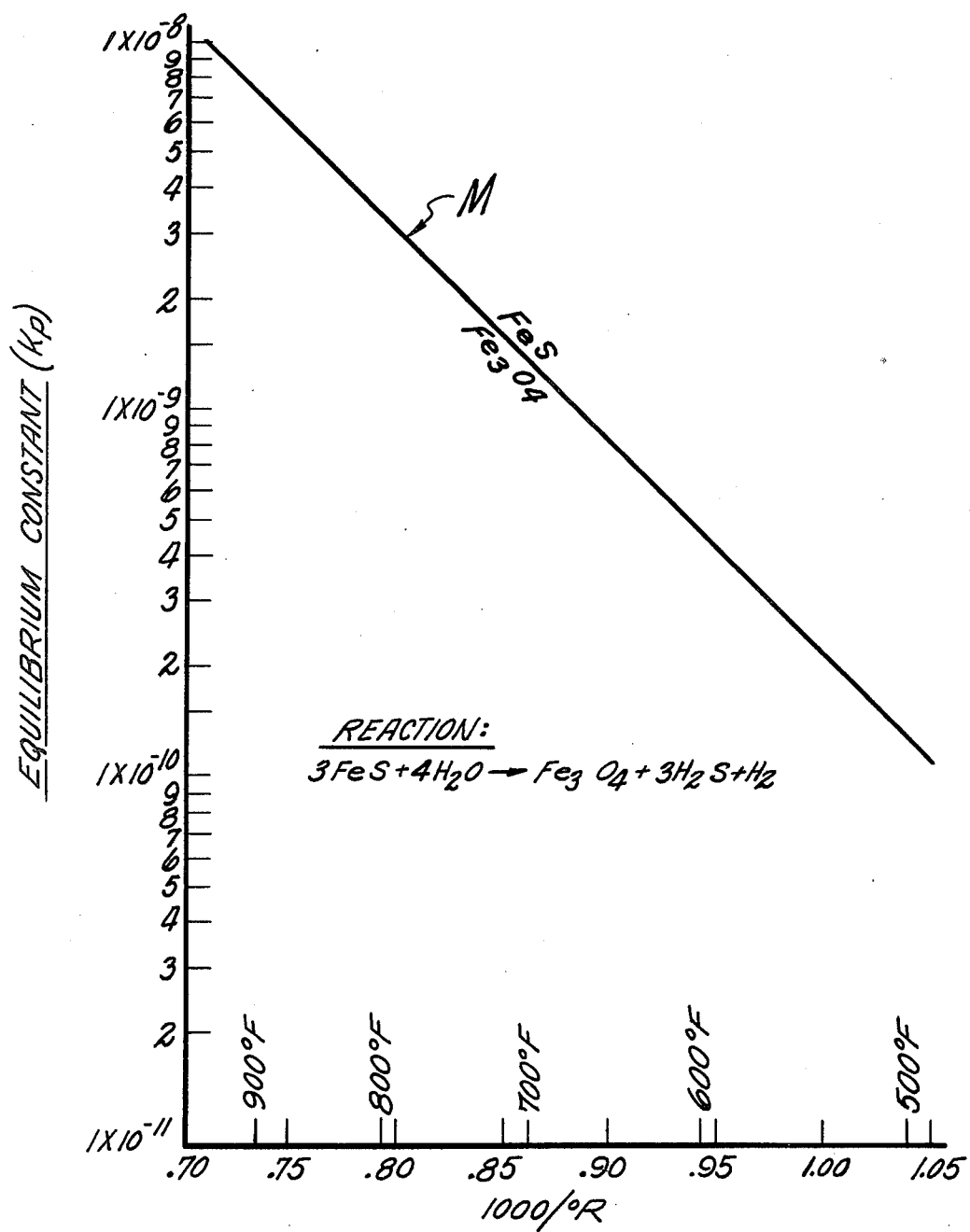
FIG. 1 is a graph showing the conditions which result in iron oxide shift catalyst being converted to iron sulfide.

Returning now to the operation of the chromia stabilized iron oxide shift converter, FIG. 1 is a graph which shows the shift converter conditions which result in the iron oxide shift catalyst being converted to iron sulfide. This occurs when operating anywhere above the line designated M. The reaction represented by the line M is $$Fe_3O_4 + 3H_2S + H_2 \rightarrow 3FeS + 4H_2O$$

Plotted on the vertical axis of this graph is an equilibrium constant $K_p$ which is a complex function of the H₂S, hydrogen, and water concentration of the gas stream as represented by the following equation:

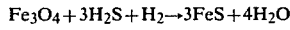

$$K_p = \frac{[H_2S]^3 [H_2]}{[H_2O]^4}$$

where [H₂S], [H₂] and [H₂O] are partial pressures. On the horizontal axis 1000 times the reciprocal of absolute temperature is plotted. For convenience some corresponding Fahrenheit temperatures are indicated directly on the graph. Note that the conversion to FeS is more likely at lower temperatures; that is, at lower temperatures the iron oxide catalyst is converted to iron sulfide at lower H₂S levels.

Figure 2:
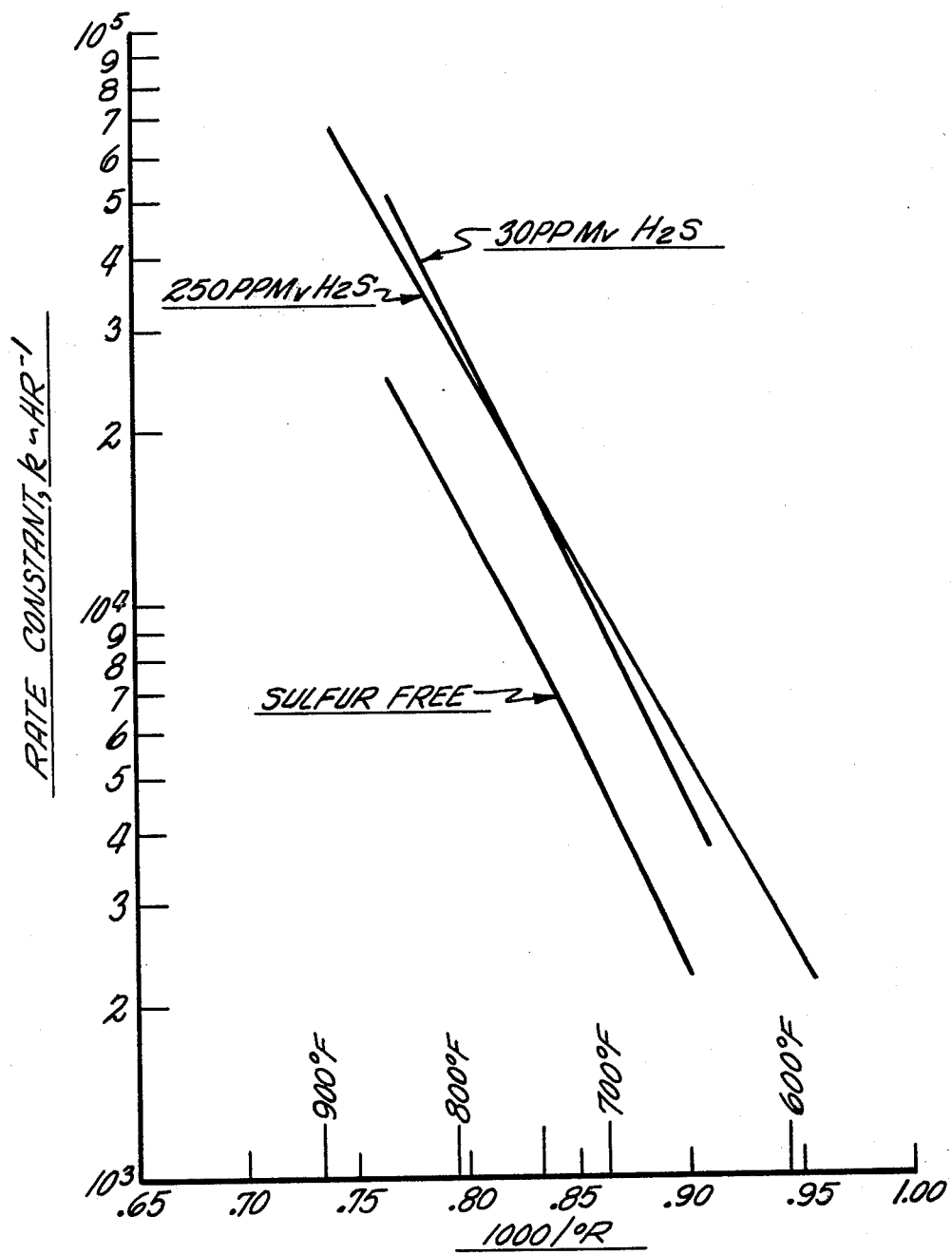
FIGS. 2 and 3 are graphs showing how different hydrogen sulfide concentrations in the gas stream affect the activity of iron oxide shift catalyst.

The activity or rate constant "k" of chromia stabilized iron-oxide shift catalyst, in units of reciprocal hours, is a complex function of the inlet concentrations of CO, H₂O, CO₂ and H₂, the flow rate to the shift converter, the equilibrium constant $K_p$ for the shift reaction at the average reactor temperature, and the exit concentration of CO. The function is known to those skilled in the art and need not be set forth herein. In FIG. 2 the activity or rate constant "k" of the catalyst is plotted on the vertical axis (using a log scale) against temperature (1000 divided by the absolute temperature) on the horizontal axis for gas streams containing 0, 30, and 250 ppm H₂S, by volume, on a dry gas basis, in the effluent from the reformer. These H₂S levels correspond to 0, 230, and 1920 ppm sulfur, by weight, in the reformer hydrocarbon feedstock, assuming all the sulfur is converted to H₂S in the reformer. In each case the gas pressure was 35 psig and the shift converter inlet CO concentration was 10% by volume. The ratio of steam to carbon at the shift converter inlet was equivalent to using a moles steam to moles carbon ratio in the reformer of 3.5. A large increase in catalyst activity is immediately apparent in the cases where the gas stream contains H₂S. Note, however, the relatively small additional increase achieved by increasing the H₂S level by a factor of about 8 (i.e., from 30 to 250 ppm). While it is believed that H₂S levels up to about 520 ppm may provide some slight additional improvement under certain conditions, at 250 ppm it is apparent that one is approaching the upper limit of catalyst activity.

Figure 3:
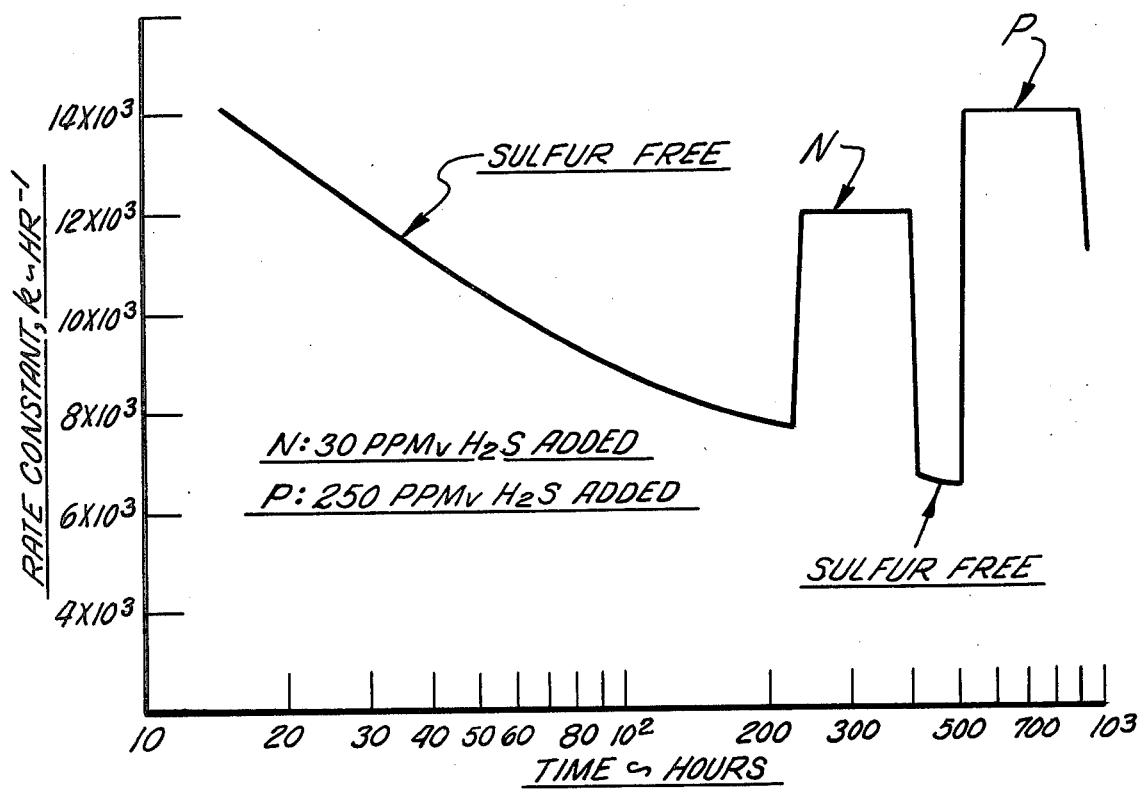

FIG. 3 is a graph which plots catalyst activity on the vertical axis against time on the horizontal axis (using a log scale). In the tests used to develop the data for this graph the shift converter inlet temperature was 730° F. and the pressure was held constant at 35 psig. The carbon monoxide inlet concentration on a dry gas basis was 10%, and the steam to carbon ratio at the shift converter inlet was equivalent to using a moles steam to moles carbon ratio in the reformer of 3.5. The gas flow rate was held constant at 116.4 standard cubic feet per hour and the volume of the catalyst bed was 0.0194 ft³.

The first 225 hours of operation was conducted with no sulfur in the gas stream. The activity of the catalyst dropped considerably during this period, but this is to be expected for a fresh catalyst since most catalyst decay occurs within the first 200 or so hours, with the decay rate leveling off considerably thereafter.

At 225 hours sufficient sulfur in the form of hydrogen sulfide was added to the gas stream entering the shift converter such that the concentration of hydrogen sulfide in the gas stream was 30 parts per million, by volume, on a dry gas basis. The line N represents an average of the catalyst activity over the period of approximately 175 hours during which time this sulfur concentration was maintained. Note that under these test conditions the activity was about 84% higher than the sulfur free activity level measured at about 500 hours.

At 400 hours the hydrogen sulfide flow into the shift converter was shut off, and the catalyst very quickly lost about half its activity, returning to the normal decay trend for sulfur free fuel. At about 525 hours the hydrogen sulfide was again introduced into the gas stream, but in an amount sufficient to provide a sulfur concentration of 250 parts per million, by volume. The line P represents an average of activity measurements taken during the period of time this higher hydrogen sulfide level was maintained. The catalyst activity was about 115% greater than the sulfur free activity level measured at about 500 hours.

At 900 hours the hydrogen sulfide level was increased to between 600 and 1040 parts per million, by volume. This is equivalent to between 4600 and 8000 parts per million, by weight, sulfur in the feedstock to the reformer. The graph shows that with this level of sulfur the catalyst activity begins to drop sharply. The test was ended before it could be determined how far the activity would fall. It is believed we were operating, for the most part, above the line M of FIG. 1.

Figure 4:
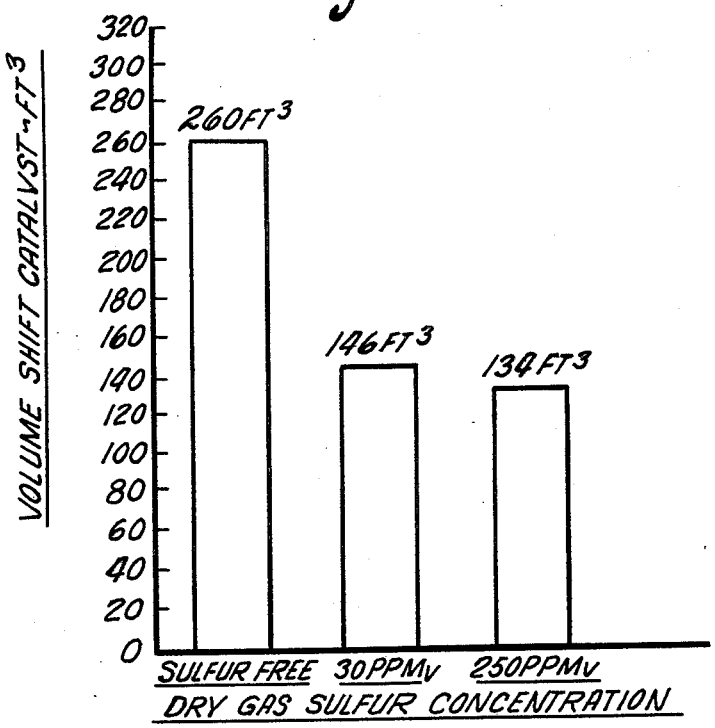
FIG. 4 is a bar graph showing the volume of shift catalyst needed for different hydrogen sulfide concentrations in the gas stream.

FIG. 4 is a bar graph showing the number of cubic feet of catalyst required to reduce the exit concentration of carbon monoxide to 3.5 volume percent per 1000 pounds per hour of feedstock fed to the reformer. In all cases the pressure of the gas stream is assumed to be 35 psig, the moles steam to moles carbon ratio of the reformer feedstock is assumed to be 3.5, and the shift converter inlet carbon monoxide concentration is assumed to be 11.6%. From left to right the bars represent a sulfur free gas flow, a gas flow with 30 parts per million hydrogen sulfide, by volume, and a gas flow with 250 parts per million hydrogen sulfide, by volume. The volume of catalyst required is determined, in each case, using a shift converter inlet temperature of 650° F. Note that only 56% of the bed volume is necessary when the hydrogen sulfide concentration is about 30 parts per million, by volume.

From data accumulated to date it is believed that when the gas stream includes anywhere between about 20 and 520 ppm $H_2S$ then the volume of catalyst required to reduce the CO concentration to a desired level under a given set of conditions should be no greater than two-thirds of the minimum amount which would be required under the same conditions if there were no $H_2S$ in the gas stream.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A method for producing hydrogen including the step of shift converting a hydrogen containing gas stream under a given set of conditions of length of time, flow rate, temperature, pressure, moles steam to moles carbon ratio, and inlet CO concentration using a chromia stabilized iron oxide shift catalyst, wherein the hydrogen sulfide content of the gas stream is maintained between 20 ppm and 520 ppm on a dry gas volume basis, but in no event more than that which would result in the conversion of the iron oxide to iron sulfide under said given conditions, and wherein the step of shift converting comprises reducing the carbon monoxide concentration of said gas stream to less than p% by volume using an amount "A" of said shift catalyst which is no greater than about two-thirds the minimum amount "B" which would be required under said given set of conditions if there were no hydrogen sulfide in said gas stream.

2. The method for producing hydrogen according to claim 1 wherein said gas stream temperature at the inlet of said shift converter is between 600° and 900° F.

3. The method for producing hydrogen according to claim 2 wherein said inlet CO concentration is between 10 and 15%, by volume.

4. The method for producing hydrogen according to claims 2 or 3 including the step of steam reforming a sulfur containing hydrocarbon feedstock in a reactor using a nickel catalyst wherein the mole ratio of steam to carbon at the inlet of the reactor is between 3 and 8 and the reactor inlet temperature is at least 1500° F., and wherein the effluent from said reactor is said hydrogen containing gas stream.

5. The method for producing hydrogen according to claim 4 wherein said mole ratio of steam to carbon at the inlet of the reactor is between 3.5 and 4.5.

6. The method for producing hydrogen according to claim 4 wherein p% is 5%.

7. The method for producing hydrogen according to claim 6 wherein "A" is no greater than about one-half "B".

8. The method for producing hydrogen according to claim 7 wherein said gas stream includes at least 250 ppm hydrogen sulfide.

* * * * *